(12) United States Patent
Stocker et al.

(10) Patent No.: US 10,427,196 B2
(45) Date of Patent: Oct. 1, 2019

(54) JOURNAL RECEPTACLE FOR A WOBBLER CONNECTION AND ROLL DRIVE TRAIN COMPRISING SUCH A JOURNAL RECEPTACLE

(71) Applicant: VOITH PATENT GMBH, Heidenheim (DE)

(72) Inventors: Juergen Stocker, Lauchheim (DE); Dieter Maier, Giengen (DE); Peter Grawenhof, Dettingen (DE)

(73) Assignee: Voith Patent GmbH, Heidenheim (DE)

( * ) Notice: Subject to any disclaimer, the term of this patent is extended or adjusted under 35 U.S.C. 154(b) by 211 days.

(21) Appl. No.: 15/531,514

(22) PCT Filed: Oct. 16, 2015

(86) PCT No.: PCT/EP2015/073973
§ 371 (c)(1),
(2) Date: May 30, 2017

(87) PCT Pub. No.: WO2016/083016
PCT Pub. Date: Jun. 2, 2016

(65) Prior Publication Data
US 2018/0250726 A1 Sep. 6, 2018

(30) Foreign Application Priority Data
Nov. 28, 2014 (DE) .................. 10 2014 224 346

(51) Int. Cl.
*F16D 1/08* (2006.01)
*B21B 35/14* (2006.01)
(Continued)

(52) U.S. Cl.
CPC .............. *B21B 35/141* (2013.01); *F16D 1/05* (2013.01); *F16D 1/101* (2013.01); *B21B 35/144* (2013.01); *F16D 2001/102* (2013.01)

(58) Field of Classification Search
CPC . F16D 1/02; F16D 1/04; F16D 1/0894; F16D 1/0882; F16D 1/0888; B21B 35/14; B21B 35/141
See application file for complete search history.

(56) References Cited

U.S. PATENT DOCUMENTS

| 3,315,993 A | | 4/1967 | Church |
| 4,136,533 A | * | 1/1979 | Okuda ................ F16D 1/0888 464/169 |
| 6,082,924 A | | 7/2000 | Seidl et al. |

FOREIGN PATENT DOCUMENTS

| DE | 367535 C | 1/1923 |
| DE | 1192885 B | 5/1965 |

(Continued)

*Primary Examiner* — Daniel J Wiley
(74) *Attorney, Agent, or Firm* — Laurence A. Greenberg; Werner H. Stemer; Ralph E. Locher

(57) ABSTRACT

A journal receptacle for a wobbler connection, in particular for the rotationally secure connection of a drive shaft, such as an articulated shaft, to a roll of a rolling mill. A wobbler hub has a receiving opening that extends in an axial direction of the wobbler hub, for the positive-locking reception of a roll journal. The receiving opening has an inner surface, extending in the axial direction and over the periphery and at least one torque transmission surface. The latter is clad at least partially with at least one wearing plate. The at least one wearing plate is held in a positive-locking manner on the torque transmission surface by at least one clamping piece, which extends in the axial direction on the torque transmission surface and which is connected to the torque transmission surface by a connecting device.

19 Claims, 2 Drawing Sheets

(51) Int. Cl.
*F16D 1/10* (2006.01)
*F16D 1/05* (2006.01)

(56) References Cited

FOREIGN PATENT DOCUMENTS

| | | |
|---|---|---|
| DE | 1921517 U | 8/1965 |
| DE | 2362524 A1 | 6/1975 |
| DE | 19710554 A1 | 9/1998 |
| DE | 10316261 A1 | 11/2004 |
| DE | 102013221123 A1 | 11/2014 |
| GB | 2400430 A | 10/2004 |

* cited by examiner

US 10,427,196 B2

JOURNAL RECEPTACLE FOR A WOBBLER CONNECTION AND ROLL DRIVE TRAIN COMPRISING SUCH A JOURNAL RECEPTACLE

BACKGROUND OF THE INVENTION

Field of the Invention

The present invention relates quite generally to a roll drive train for driving a roll in a rolling mill, and more particularly to a journal receptacle for a wobbler connection, in particular for the rotationally secure connection of a drive shaft, such as an articulated shaft, to the roll of a rolling mill, more specifically the device includes a wobbler hub, which has a receiving opening, extending in an axial direction of the wobbler hub, for the positive-locking reception of a roll journal. The receiving opening has an inner surface, extending in the axial direction and over the periphery and having at least one torque transmission surface. The latter is clad at least partially with at least one wearing plate. The invention also relates to a roll drive train with at least one drive shaft and a roll-side end of the drive shaft. The end is configured for connection to a drive journal of a roll. The drive journal is constructed as a roll journal.

Wobbler connections serve in rolling mills primarily for the rapid coupling and decoupling of the drive shafts-work rolls connection, wherein the drive shafts are generally constructed as articulated shafts due to the fact that the rolls are positioned relatively close together and the drive machinery in the drive trains requires a certain installation space. In such a wobbler connection, the drive journal of the roll, in the present case referred to as the roll journal, which has at least one, generally two flattened surfaces for the torque transmission, is introduced into a wobbler hub, of diametrically opposite design, of the drive shaft, in particular an articulated shaft, wherein in the wobbler hub at least one, in particular two corresponding flattened torque transmission surfaces are provided. With the exception of the flattened areas, the surfaces of the roll journal and of the wobbler hub are generally of circular design, viewed in a radial section through the wobbler hub or the roll journal, or of cylindrical design.

In current embodiments, the torque transmission surfaces in the wobbler hub are clad with wearing plates, so that the surface of the torque transmission surfaces is generally fully covered by generally one wearing plate per torque transmission surface and no direct contact of the torque transmission surfaces of the wobbler hub with the torque transmission surfaces of the roll journal is made. These wearing plates can on the one hand be made of a material which is more wear-resistant in relation to the wobbler hub, and on the other hand enable that, in the event of wear, not the entire wobbler hub, but only the wearing plates, have to be exchanged. Such an embodiment also enables worn wobblers to be reworked after a certain operating period.

For the published prior art, reference is made to DE 197 10 554 A1 and DE 1 921 517 U.

Traditionally, the wearing plates are screwed onto the wobbler hub with screws. In practice, this gives rise to the problem that after a certain operating period the fastening screws work loose, or even break.

SUMMARY OF THE INVENTION

The object of the present invention is to improve a journal receptacle for a wobbler connection or a roll drive train of the type stated in the introduction, such that said loosening and breakage of the fastening screws or other fastening means can be effectively prevented.

The object of the invention is achieved by a journal receptacle as claimed and a roll drive train as claimed. In the dependent claims, advantageous and particularly expedient embodiments of the invention are defined.

The invention is based on the recognition that, in the course of the operating period, the traditional fastening screws are subjected to dynamic loads which are avoidable. For instance, in the case of the previous wearing plates, the greatest wear namely comes about in the marginal region of the torque transmission surface in the journal receptacles, related to the peripheral direction of the receiving opening. In the central region, that is to say in a region in the middle of the torque transmission surface, which region extends on both sides of a center line running in the axial direction of the journal receptacle, the wear is significantly less. If now, as traditionally, the wearing plates are screwed with fastening screws on the torque transmission surfaces, wherein the fastening screws extend through corresponding through holes in the wearing plates and the through holes are positioned in a region with comparatively high wear close to the margin of the torque transmission surfaces, then a tensile and bending stress materializes on the fastening screws, because the wearing plates "rattle" in the high-wear region under the heads of the fastening screws or, in the case of one-piece wearing plates, the wearing plates mutually tilt, with each change of load, over that region of the middle which has the lesser wear. These dynamic loads due to the loosening in the region of the fastening screws are precluded according to the invention by virtue of the fact that one or more wearing plates, in particular two wearing plates per torque transmission surface, are held in a positive-locking manner on the torque transmission surface by means of a clamping piece, which extends in the axial direction on the torque transmission surface and which is connected to the torque transmission surface by suitable connecting means, such as screws, in particular without the at least one wearing plate itself being screwed to the torque transmission surface or without it having appropriate through holes for fastening screws.

More specifically, a journal receptacle according to the invention for a wobbler connection, in particular for the rotationally secure connection of a drive shaft, for instance an articulated shaft, in particular a universal joint shaft, to a roll of a rolling mill, has a wobbler hub, which comprises a receiving opening, extending in an axial direction of the wobbler hub, for the positive-locking reception of a roll journal. The receiving opening has an inner surface, extending in the axial direction and over the periphery and having at least one torque transmission surface, which latter is clad at least partially, or advantageously fully, with at least one wearing plate. The wearing plate thus covers the torque transmission surface to a greater or lesser degree, and in the assembled state of the wobbler connection, that is to say with the roll journal inserted in the receiving opening, is positioned between the wobbler hub, or between the torque transmission surface of the wobbler hub, and the roll journal, or its corresponding torque transmission surface.

In order that the torque transmission surface, in the sense of the present invention, can transmit a torque from the wobbler hub to the roll journal, said wobbler hub is of more or less flattened construction and, in a radial section through the wobbler hub, deviates from the circular form. It is not necessary, however, for this torque transmission surface to be made fully flat. In particular, as is further explained below, the torque transmission surface in the wobbler hub is formed by two plane-parallel flat portions having an intervening groove running in the axial direction.

According to the invention, the at least one wearing plate is now held in a positive-locking manner on the torque transmission surface by means of at least one clamping piece, which extends in the axial direction on the torque transmission surface and which is connected to the torque transmission surface by connecting means.

Particularly advantageously, the clamping piece, viewed in the peripheral direction of the receiving opening in the wobbler hub, is positioned in a central region extending in the axial direction, in particular is positioned along a center line, running in the axial direction, on the torque transmission surface, because it is there, as stated, that the least wear occurs, and thus a loosening of the clamping piece, if this, for instance, is screwed on the torque transmission surface, is avoided.

The connecting means are realized, for instance, as threaded pins or screws, in particular as flat-head screws in the clamping piece, which, from the free surface of the clamping piece, that is to say from the side facing away from the connection of the clamping piece to the torque transmission surface, are screwed through the clamping piece into the wobbler hub. However, an advantageous alternative embodiment has fastening screws or threaded pins or other connecting means, which are screwed radially from outside through through-openings in the wobbler hub, from the torque transmission surface, into the clamping piece, so that the clamping piece has only to have blind holes and no through-holes. In principle, one connecting means per wearing plate is also sufficient.

According to a favorable embodiment of the invention, the clamping piece is inserted in groove made in the torque transmission surface. The clamping piece is thus held in a particularly exact and secure manner within the receiving opening of the wobbler hub. Also it is then particularly easily possible to brace the clamping piece against the wearing plate or plates radially from inside, wherein at the same time, by virtue of the groove, a secure lateral guidance of the clamping piece during the bracing process is obtained.

Particularly advantageously, the clamping piece is inserted, with a transition fit or press fit, in the groove of the wobbler hub or in the groove in the torque transmission surface.

According to an advantageous embodiment of the invention, the clamping piece, viewed in a radial section through the wobbler hub, has a T-shape. Such a T-shape can be inserted with its foot in said groove and, by the two arms, two wearing plates positioned on opposite sides of the clamping piece along the axial direction, can be partially covered and held against the (same) torque transmission surface. The partial coverage can be achieved by a recess in the marginal region of the wearing plate or by a groove which is made laterally in the wearing plate and in which the clamping piece engages with an arm.

The at least one wearing plate, in particular two wearing plates per torque transmission surface, which respectively extend fully over the whole of the torque transmission surface in the axial direction, have according to one embodiment, viewed in a radial section through the wobbler hub, a T-shape, which in particular is oriented rotated through 180° relative to the T-shape of the clamping piece. As a result, said recess is formed in the marginal region of the wearing plate, in which the clamping piece can then engage with an arm.

In order to hold the at least one wearing plate not only by the clamping piece, the at least one wearing plate, on a side facing away from the clamping piece, can form with the wobbler hub an undercut, i.e. engage in a recess of the wobbler hub, so that a lifting of the wearing plate on this side from the torque transmission surface is prevented by form closure. Given a T-shape of the wearing plate, this can form with an arm the undercut, that is to say engage in this recess in the wobbler hub. The other arm is then advantageously covered by the, for instance, likewise T-shaped clamping piece, for the formation of an undercut.

According to an alternative embodiment, the mutually abutting contact surfaces of the clamping piece and of the wearing plate run obliquely to the underlying surface of the torque transmission surface. Thus, viewed in a radial section through the wobbler hub, the clamping piece, starting from its free end facing away from the connection to the torque transmission surface, tapers in the direction of the connection end, in particular on both sides or on both sides conically, in order to form an undercut with that side of the at least one wearing plate which bears against the clamping piece. Together with a corresponding design of that side of the wearing plate which is facing away from the clamping piece and of the here adjoining contact surface of the wobbler hub, the wearing plate can be held in a dovetail groove which is formed on one side by the clamping piece and on the other side by the wobbler hub.

It has proved to be a particularly favorable embodiment if the clamping piece is enclosed in the axial direction between two wearing plates, wherein the clamping piece at the same time holds these two wearing plates—which advantageously extend over the entire length in the axial direction of the torque transmission surface, wherein, advantageously, the clamping piece can also correspondingly extend over the entire axial length of the torque transmission surface—in a positive-locking manner on the torque transmission surface, in particular together with respectively a corresponding undercut on the side facing away from the clamping piece, which side engages in a groove of the wobbler hub. Both wearing plates can have, either in a radial section through the wobbler hub or in total, an identical shape.

A roll drive train according to the invention serves to drive a roll in a rolling mill. It has at least one drive shaft having a roll-side end which is configured for connection to a drive journal of the roll, said drive journal being constructed as a roll journal.

According to the invention, the roll-side end of the drive shaft has a journal receptacle of the type according to the invention.

Here too, the drive shaft is generally constructed as an articulated shaft, for instance as a universal joint shaft.

Through the inventive positioning of a clamping piece in the less loaded wobble region having low elastic deformations, the traditional loosening of the securement of the wearing plates is avoided. In particular, the clamping piece does not lie directly in the force flow between the wobbler hub and the roll journal, but alongside these force flow regions, which are formed by the outer segments of the torque transmission surfaces, related to the peripheral direction of the receiving opening. Dynamic loads of fastening screws are largely avoided. The solution according to the invention ensures the reliable operation of the wobbler connection without the risk of loosened or broken screws.

BRIEF DESCRIPTION OF THE SEVERAL VIEWS OF THE DRAWING

The invention shall be described below by way of example with reference to illustrative embodiments and the figures, wherein.

DESCRIPTION OF THE INVENTION

Figure 1:
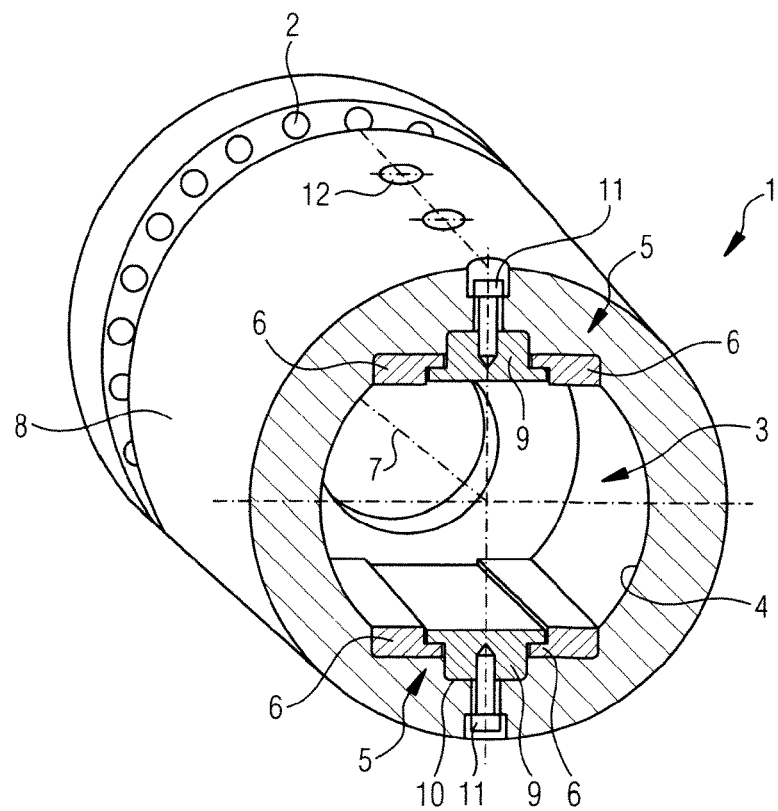
FIG. 1 shows a first illustrative embodiment of the invention having two wearing plates, held by a clamping piece, per torque transmission surface.

In FIG. 1 is represented by way of example a journal receptacle 1, which can be connected to the roll-side end of the drive shaft, in particular the universal joint shaft of a roll drive train, for instance by means of a flange joint 2. Alternatively, the journal receptacle 1 is configured integrally in the roll-side end of the drive shaft.

The journal receptacle 1 has a receiving opening 3, which is defined and configured for the introduction of a roll journal of the roll (not represented). The receiving opening 3 has an inner surface 4, which, with its portions positioned outside the torque transmission surfaces 5, is in direct contact with the outer surface of the roll journal. The torque transmission surfaces 5, by contrast, are clad with wearing plates 6, in the present case two wearing plates 6 per torque transmission surface 5.

The wearing plates 6 extend in the direction of the axial direction 7 of the wobbler hub 8, which forms the journal receptacle 1 and delimits the receiving opening 3. Viewed In the axial direction, respectively two wearing plates 6 are positioned side by side, held by a clamping piece 9 positioned between these.

Each clamping piece 9 is inserted in a groove 10 of the respective torque transmission surface 5, which for the rest, that is to say apart from the groove 10, is of flat configuration. Each clamping piece 9 is screwed in the groove 10 by means of screws 11, wherein, in the shown illustrative embodiment, the screws 11 are positioned along a center line, extending in the axial direction 7, of the torque transmission surfaces 5, so that the connection region of the clamping pieces 9 are positioned on the torque transmission surfaces 5 outside the marginal regions positioned in the force flow, which are covered with the wearing plates 6.

According to the illustrative embodiment in FIG. 1, the clamping pieces 9 have in the shown radial section a T-shape, the foot of which is respectively inserted in the groove 10 and the two arms of which extend over a recess in the marginal region of the wearing plates 6, so that the wearing plates 6 are held in a positive-locking manner on the torque transmission surfaces 5.

In the shown illustrative embodiment, the clamping pieces 9 are screwed radially from outside through the wobbler hub 8, see the corresponding through-holes 12 in the wobbler hub 8.

Figure 2:
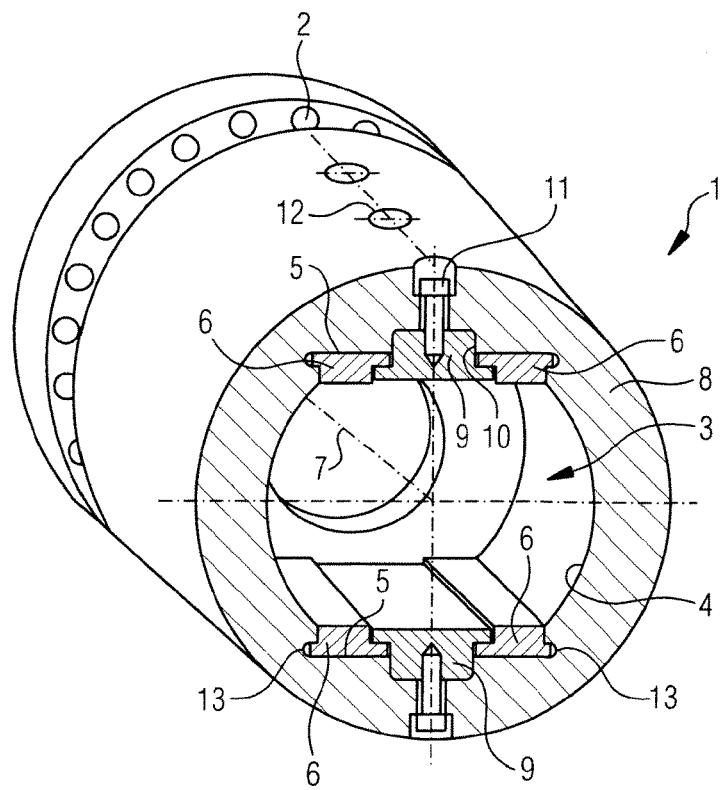
FIG. 2 shows an illustrative embodiment in accordance with FIG. 1, yet with additional securement of the wearing plates with an undercut in the wobbler hub.

In the illustrative embodiment according to FIG. 2, which broadly corresponds to that of FIG. 1, wherein mutually corresponding features are labeled with mutually corresponding reference symbols, the wearing plates 6, in the shown radial section, are also of T-shaped construction, yet are arranged rotated through 180° relative to the T-shape of the clamping pieces 9. It is hereby possible for the wearing plates 6 to engage in a holding groove 13 in the wobbler hub 8, with their arm facing away from the clamping piece 9, in order to form an undercut, which more reliably prevents the wearing plates 6 from being lifted off the torque transmission surfaces 5 once the clamping piece 9 is inserted. The surface of the foot of the wearing plates 6 hence forms the contact surface for the roll journal (not shown here in detail).

Figure 3:
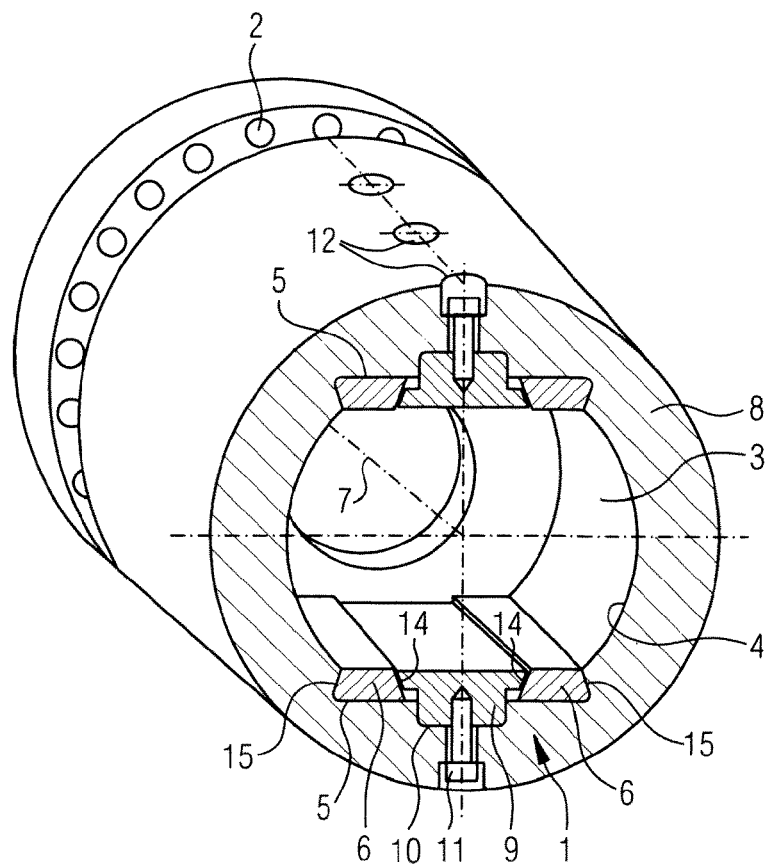
FIG. 3 shows a modification of the illustrative embodiment according to FIG. 2, with conically designed wearing plates instead of the T-shaped wearing plates.

In the embodiment according to FIG. 3, a uniform bilateral locking of each wearing plate 6 on the torque transmission surfaces 5 is achieved, on the one side by contact surfaces 14, positioned obliquely to the surface of the torque transmission surfaces 5, between clamping piece 9 and wearing plates 6, and on the other side between oppositely obliquely positioned contact surfaces 15 between the wearing plates 6 and the wobbler hub 8. By virtue of the conical design of the clamping pieces 9 in conjunction with the design of the contact surfaces 15, the wearing plates 6 are held respectively in a dovetail groove.

Figure 4:
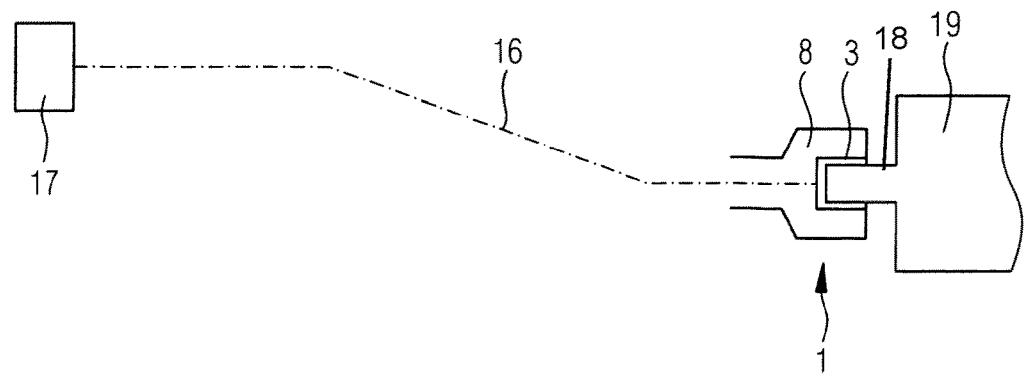
FIG. 4 shows by way of example a roll drive train according to the invention.

In FIG. 4, the positioning of a journal receptacle 1 at the axial end of a drive shaft 16 (here constructed as a universal joint shaft) of a roll drive train is represented schematically. The drive shaft 16 is driven at least indirectly by the drive machine 17. The journal receptacle 1 with its wobbler hub 9 is slid onto the roll journal 18 of the driven roll 19 and driven over the torque transmission surfaces 5 (not represented here in detail).

The invention claimed is:

1. A journal receptacle for a wobbler connection, the journal receptacle comprising:
    a wobbler hub formed with a receiving opening, extending in an axial direction of said wobbler hub, and configured for receiving a roll journal in a positive-locking engagement; wherein
    said receiving opening having an inner surface, extending in the axial direction and circumferentially, said inner surface including at least one torque transmission surface;
    at least one wearing plate disposed on, and in contact with, said torque transmission surface for contacting and engaging with the roll journal when the roll journal is inserted in said receiving opening; and
    at least one clamping piece mounting said at least one wearing plate in a positive-locking engagement on said torque transmission surface, said at least one clamping piece extending in the axial direction on said torque transmission surface and being connected to said torque transmission surface by at least one connecting device.

2. The journal receptable according to claim 1, configured for a rotationally secure connection of a drive shaft to a roll of a rolling mill.

3. The journal receptacle according to claim 1, wherein said clamping piece, viewed in the circumferential direction, is positioned in a central region on said torque transmission surface.

4. The journal receptacle according to claim 3, wherein said central region of said torque transmission surface extends along a center line and in the axial direction.

5. The journal receptacle according to claim 1, wherein said at least one connecting device is at least one of a threaded pin or a screw.

6. The journal receptacle according to claim 1, wherein said torque transmission surface is formed with a groove and said clamping piece is inserted in said groove.

7. The journal receptacle according to claim 6, wherein said clamping piece is inserted in said groove with a transition fit or press fit.

8. The journal receptacle according to claim 6, wherein said clamping piece, in a radial section through said wobbler hub, has a T-shape with a foot inserted in said groove and partially covers said at least one wearing plate and/or engages in a wearing plate groove or recess formed in said wearing plate.

9. The journal receptacle according to claim 1, wherein said at least one wearing plate is one of a multiplicity of wearing plates held by said clamping piece in a positive lock on said torque transmission surface.

10. The journal receptacle according to claim 1, wherein said at least one wearing plate, in a radial section through said wobbler hub, has a T-shape.

11. The journal receptacle according to claim 1, wherein said at least one wearing plate, in a radial section through said wobbler hub, has a T-shape and said clamping piece has a T-shape rotated through 180° relative to the T-shape of said at least one wearing plate.

12. The journal receptacle according to claim 1, wherein said at least one wearing plate, on a side facing away from said clamping piece, forms an undercut with said wobbler hub.

13. The journal receptacle according to claim 1, wherein said clamping piece, in a radial section through said wobbler hub, tapers from a free end, facing away from a connection to said torque transmission surface, in a direction of a connection end.

14. The journal receptacle according to claim 13, wherein said clamping piece tapers from the free end to the connection end on one side or on both sides conically and forms an undercut with a side of said at least one wearing plate that bears against said clamping piece.

15. The journal receptacle according to claim 13, wherein said at least one wearing plate is held in a dovetail groove formed on one side by said clamping piece and on the other side by said wobbler hub.

16. The journal receptacle according to claim 1, wherein said clamping piece is enclosed in the axial direction between two said wearing plates and holds said wearing plates in a positive-locking connection in said wobbler hub.

17. The journal receptacle according to claim 16, wherein said two wearing plates have an identical shape in a radial section through said wobbler hub.

18. A roll drive train, comprising:
a drive shaft;
said drive shaft having a roll-side end configured for connection to a drive journal of a roll, said drive journal being constructed as a roll journal; and
a journal receptacle according to claim 13 at said roll-side end of said drive shaft, said journal receptacle having said roll journal inserted into said receiving opening and in contact with said at least one wearing plate disposed on said torque transmission surface.

19. A journal receptacle for a wobbler connection, the journal receptacle comprising:
a wobbler hub formed with a receiving opening, extending in an axial direction of said wobbler hub, and configured for receiving a roll journal in a positive-locking engagement; wherein
said receiving opening having an inner surface, extending in the axial direction and circumferentially, said inner surface including at least one torque transmission surface;
at least one wearing plate disposed on said torque transmission surface, said at least one wearing plate, in a radial section through said wobbler hub, having a T-shape; and
at least one clamping piece mounting said at least one wearing plate in a positive-locking engagement on said torque transmission surface, said at least one clamping piece extending in the axial direction on said torque transmission surface and being connected to said torque transmission surface by at least one connecting device.

* * * * *